United States Patent [19]

Babsch et al.

[11] Patent Number: 4,673,810

[45] Date of Patent: Jun. 16, 1987

[54] INCREMENT SENSING WITH THREE BEAM MARK DETECTION

[75] Inventors: Alfred Babsch, Ulm; Dieter Beth, Thalfingen; Werner Panzer, Senden; Johann Stempfle, Pfaffenhofen, all of Fed. Rep. of Germany

[73] Assignee: Mannesmann AG, Duesseldorf, Fed. Rep. of Germany

[21] Appl. No.: 734,674

[22] Filed: May 15, 1985

[30] Foreign Application Priority Data

May 19, 1984 [DE] Fed. Rep. of Germany ....... 3418798

[51] Int. Cl.⁴ .............................................. G01D 5/34
[52] U.S. Cl. .......................... 250/231 SE; 250/237 G
[58] Field of Search ................. 250/201 DF, 231 SE, 250/237 G; 340/347 P; 356/395

[56] References Cited

U.S. PATENT DOCUMENTS 3,992,574 11/1976 Bouwhuis et al. ........... 250/201 DF
4,085,423 4/1978 Tsunda ........................ 250/201 DF Primary Examiner—David C. Nelms
Attorney, Agent, or Firm—Ralf H. Siegemund

[57] ABSTRACT

The present invention relates to the digital control of a machine or equipment, particularly but not exclusively a matrix printer under utilization of an increment step sensor monitor or pick up operating on the basis of optic electronic principles and including at least one source of radiation and at least two pickup transducers disposed in the ray path from the source of illumination and further including a marker track composed of alternating transparent or translucent and opaque increments being unilinearly moveable, either on a curved or on a straight path.

11 Claims, 5 Drawing Figures

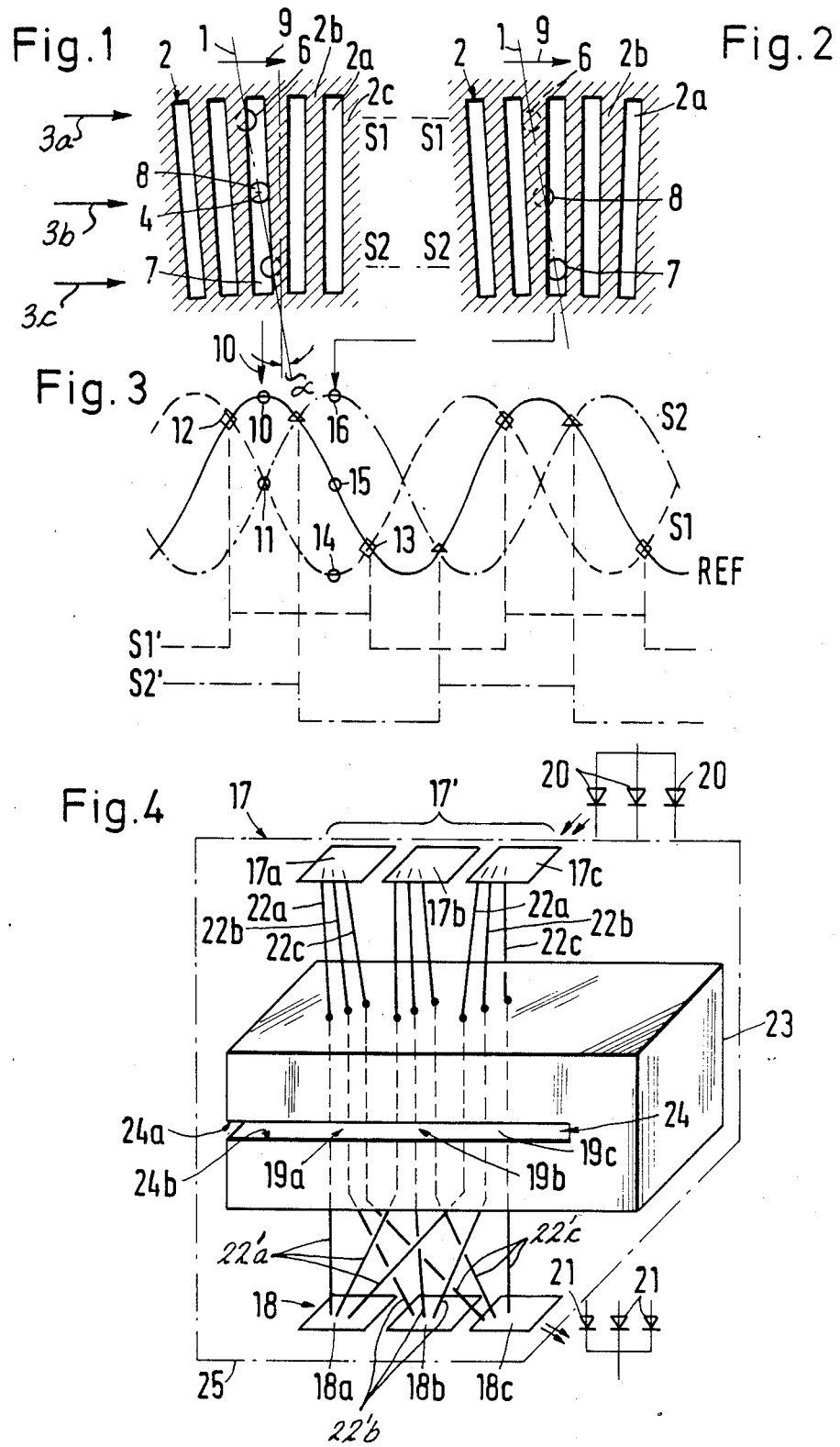

INCREMENT SENSING WITH THREE BEAM MARK DETECTION

BACKGROUND OF THE INVENTION

Devices of the type to which the invention pertains are generally known, and they include for example facilites for the generation of phase shifted signals by operation of two sensors, whereby in addition, the two sensors are placed on an axis which is oriented at an actue angle in relation to the predominant extension of the passing markings. Increment pickup devices furish signals for obtaining digital machine control, particularly for controlling straight linear or rotating movements of the device such as a motor to be controlled so as to obtain for example speed control in open or closed loop configuration. The actual speed is ascertained by the aforementioned increment sensors e.g. through pulse counting per unit time. The resulting signals update position counters the count state of which is used to control for example the drive motor and to correct its speed using drive pulses generated by currents that use the signals from the increment sensors.

Increment sensors are not only realized on the basis of optic/electronic principles, but sometimes different states of magnetism are used to meter the passage of physical increments. However the optical electronic appproach is preferred. The sensors and pickup devices are usually positioned in relation to a marking track so that they furnish two clock signals differing in phase by 90 degrees. In some instances a zero pulse is separately acquired. The sign of the phase difference of the signals as picked up is directly indicative of the direction of movement.

Turning now specifically to the preferred field of application it is known to provide for the open or closed loop speed and/or position control of a carriage in a matrix printer, carrying the print head. Optic electronic increment sensors are used in different configurations of scanning but always using transducers being comprised of phototransistors. Other motors in such a printer are controlled analogously. A typical device of the type to which reference is made presently is disclosed in German printed patent application No. 3,014,821 (see also U.S. Pat. No. 4,446,367).

It was found that phototransistors have certain drawbacks which cannot be neglected. The gain or amplification increases with increasing temperature but decreases with increasing frequency. Light emitting diodes are used as light sources in the pick up structure can be used, moreover, to compensate to some extent the temperature dependency of the phototransistors, simply because the illuminating output of a light emitting diode decreases with increasing temperature. Without active control, however, such compensation is to some extent a random phenomenon because the temperature rise in the phototransistor is not coupled, as far as circuit is concerned or otherwise, with the temperature rise of the light emitting diode. Also, the gain characteristics of a phototransistor does not coincide with the characteristic drop in luminous output of the diode. In such a case the diodes have to be specifically selected vis-a-vis the temperature characteristics of the phototransistor. In some cases the problem was solved in that phase shifted signals are used respectively as zero and 90 degrees signals. For purposes of controlling the luminous output of the diode a third transducer was used receiving radiation from the diode but not through the track. The output was then used in some form to obtain temperature compensation. However it was found in practice that temperature compensation in this manner is inadequate.

DESCRIPTION OF THE INVENTION

It is an object of the present invention to provide a new and improved digital control for machines and devices under utilization of electro-optical, increment scanning, tracking the progression of a moving part but being insensitive, at least within a certain range, against heating such that the measuring and control signals gained from the electro-optical transducer device is still accurate without requiring immediate and direct compensation towards a fixed work point and without requiring particular compensation structure.

In accordance with the preferred embodiment of the present invention it is suggested to provide a triple scanning system of the type referred above but wherein these outermost beams are used for scanning a marking track near its border, for the production of signals which are directly in phase opposition and in between these two outermost beams, a central one serves to provide a reference signal which has a phase difference of plus/minus 90 degrees with respect to the modulation provided by the marker track to the outermost beams or beam portions. This being the basic system of which a more sophisticated system is composed, it uses three parallel or concentric tracks, each being scanned by three beams, two acting along the borders and one in the middle. The outputs are combined in that one photoreceiver responds to the three beams along one edge or border of each of the three tracks, a second receiver responds to the beams scanning the respective other boarders and the third receiver responds to all three center scanning beams.

The invention permits an economical procedure because adjusting and testing is reduced and limited. The reference signal is not provided for purposes of feedback control but is directly provided for the production of two 90 degrees out of phase measuring clock and tracking signals. This arrangement and method in fact suppresses the effects of any temperature rise and of any aging of the light emitting diode because the central reference beam is subjected through changes such as tumbling of the carrier (e.g. disc) or the track markings.

In furtherance of the invention it is suggested to provide a single light source but separating the output into three beams respectively associated with three transducers facing the beams whereby the outer transducers receive analogously outer beams to produce the requisite signals and the central transducer receives the central beam for purposes of generating the reference signal. The common light source prevents the effect of temperature increases from parasitically propagating into the system and variable radiation power will not be effective because for illumination fields covering the same area, the same relative areal luminous power arises independently from any intensity variations and total output of the illumination source. Therefore in this particular form it is not necessary to provide the earlier mentioned compensation structure.

The invention, as stated, can be realized towards using a single light source in that the three light beams needed are associated respectively with the marking track and each of the beams from the same transmitter such as a light emitting diode provides the requisite illumination that varies throughout the system in unison, while on the other hand the three transucers for picking up the three different beam portions are comprised of a threefold or triple photodiode. Under the assumption that similar radiation or areal illumination occurs at the transmitter and receiver (transducer) planes, similar electrical signals are produced in the photodiodes which do not require any particular compensation structure nor is it necessary to trim the operating point.

Digitalization of the received signals including the conversion of any sine wave signal into a rectangularly shaped signal is obtained in that the sine waves resulting from scanning alongside the outside border or margin as well as the reference signal are amplified and referenced against each other by means of comparator circuits wherein they are changed into rectangular signals having relative phase position that differs by 90 degrees.

From the point of view of construction it is of advantage to combine light source, conductors and transducers for the several tracks into a single unit which ensures the integrity of the position of the various parts in relation to each other and here particularly of the light conductors. Therefore adjustment is not necessary.

DESCRIPTION OF THE DRAWINGS

While the specification concludes with claims particularly pointing out and distinctly claiming the subject matter which is regarded as the invention, it is believed that thee invention, the objects and features of the invention and further objects, features and advantages thereof will be better understood from the following description taken in connection with the accompanying drawings in which:

FIG. 1 illustrates a single marking track having a first position to a particularly adjusted increment sensor and pick up system;

FIG. 2 illustrates the same marking track but in a second position in relation to the increment sensor system;

FIG. 3 is a signal diagram in several levels showing various signals as produced by the device shown in FIGS. 1 and 2;

FIG. 4 is a perspective but somewhat schematic view of a construction unit which is comprised of a light source, light conductors, equipment carrier and transducers.

Figure 5:
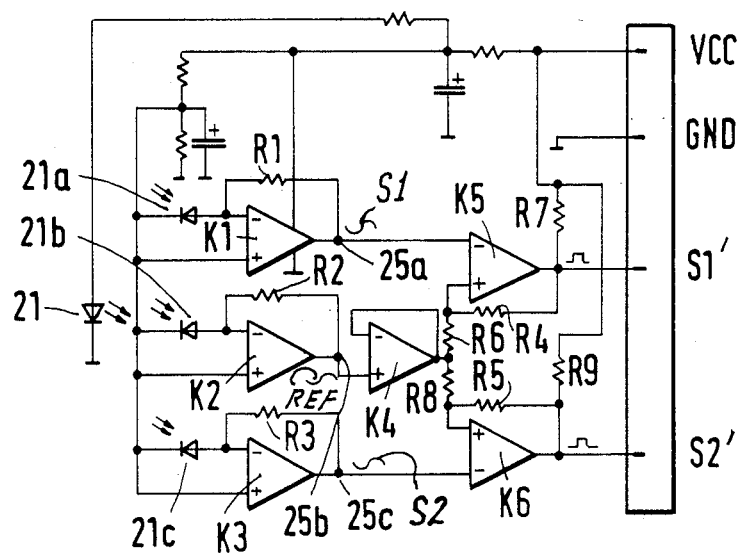
FIG. 5 is a circuit diagram illustrating processing and conversion of sine wave signals under utilization of a reference signal as produced in the device shown in the preceding figures.

Proceeding now to the detailed description of the drawings, FIGS. 1 and 2 generally illustrate a three part optical electronical increment sensor 6, 7, 8 arranged along a particular axis 1. A marking track 2 moves under that set of sensors. As was outlined above the motion may be a straight one or a curved one but is unilinear in either case. The marking track 2 is comprised of transparent or translucent slots 2a separated by opaque markings 2b or the like.

As stated the markings may be part of a straight linear arrangement but in this particular embodiment it is assumed that the markings are aranged more or less close to the periphery of a circular disc 2c being affixed for example to the shaft of a drive such as the output shaft of a motor. Such an arrangement is known per se and is not illustrated. The motor may be provided for driving the carriage of a matrix print head. The marking track disc 2c in particular may be of metal having the appropriately arranged number of slots separated by bars. In the alternative a basically transparent or translucent (glass, synthetic) disc may be provided with printed on markings in representation of the opaque markings as illustrated.

The optical electronic increment sensing system preferably operates with infrared light. It is comprised of three pickup transducers 6, 7, 8 arranged along the axis 1 which axis has an oblique angle alpha in the area of effectiveness in relation to the central direction of extension or central axis of any of the slots 2a or of the respective adjoining parallel bars 2b. If the angle alpha is zero, all three transducers 6, 7, 8 will produce synchronously coinciding signals. The scanning axis 4 extends perpendicular to the plane of extension of the disc 2c and of the drawing and, preferably, coincides centrally with the beam scanned by transducer 8 for producing particularly the reference signal REF.

The arrangement is constructed such that two light beams are outwardly positioned in relation to the scanning axis to be scanned by transducers 6 and 7 while a third beam is centrally located thereto for being scanned by transducer 8. As per FIGS. 1 and 2 it is assumed that the marking track 2 runs in the direction of arrow 9. Two outer beams scan the marking track along margins, edges or borders thereof as indicated by 3a and 3c. The central scanning is carried out along an arrow identified by 3b. The central beam in the position shown in FIG. 1 is completely unobbscured by any of the bars 2b and is thus traversing a particular slot 2a centrally; transducer 8 thus receives maximum input. Therefore the reference signal REF at the point 10 in FIG. 3 has a maximum value. The angle alpha is selected such that under the same situation the outer beams scanning along 3a and 3b reach their respective transducers 6 and 7 at about half of their intensity so that this way one obtains phase positions for the dashed and dash dotted characteristics of signals $S_1$ and $S_2$ which intersect in point 11. The point 11 is actually situated on the zero line of the several sinusoidal curves and coincides with the occurence of the maximum 10 of the reference signal REF.

The intersection 12 of the reference signal with the signal $S_1$ marks the beginning of a signal period or cycle until intersection 13 is reached. Signals $S_1$ and $S_2$ are respectively leading and lagging by 90 degrees in relation to the reference signal REF. The operating state particularly demonstrated in FIG. 2 shows the transducer 6 to be completely covered by one of the bars 2b so that the signal $S_1$ has a minimum at that point which is indicated as point 14 in FIG. 3. The reference signal at that point is produced as a result of a transducer 8 being half covered and therefore traverses at this point the zero line identified for the reference signal as point 15. The signal $S_2$ on the other hand is identified by total unobscuredness of the transducer 7 and reaches a maximum level identified by the point 16 in FIG. 3.

The signals $S_1$ and $S_2$ as shown in FIG. 3 are in fact sinusoidal signals and they are to be converted into rectangular or square shaped signals $S_1'$ and $S_2'$ shown representatively in the lower portion of FIG. 3; FIG. 5 illustrates the circuit by means of which the sinusoidal signals are in fact converted into rectangular signals. Details will be described below.

After having described certain aspects in principle, reference is now made to FIG. 4 showing a system which, for practical purposes eliminates the drawbacks noted in the introduction, through redundancy and crossover. However the FIG. 4 can also be interpreted as a realization of a single track scanning system. Uniform illumination or radiation density of the luminous output characteristics is obtained under utilization of a single light source such as for example 17a. The light source i.e. an infrared source 17a is associated with a marking track such as 19a. Either a single light source collectively designated by 17' is associated with three or more marking tracks or three sources 17a, 17b and 17c form a group. In case of a single light transmitter or source one obtains the advantage that the individual sensors of the system 1 can be placed into or switched out of the system just as is required for purposes of open or closed loop control corresponding to the principle of multiple signal formation.

Each transmitter could be associated on its respective track with a single transducer 18 however, there are shown three transducers 18a, 18b and 18c. In fact the association is such that for each marking track, just as 19a, three different portions are scanned as was outlined above with reference to FIGS. 1 and 2, and correspondingly there are three transducers, labeled here 18a, 18b and 18c as stated.

Considering now more details of FIG. 4 there are illustrated three marking tracks 19a, 19b, and 19c each having slots such as 2a and bars 2b. If the marking carrier is a disc, then these tracks are all concentrical. This then constitutes a more extensive embodiment and example of realizing the invention. The light source 17 composed here of the three sources 17a, 17b and 17c is realized by a triple light diode 20 represented in the drawing by appropriate circuit diagram symbol. The transducer 18 is composed of three transducers 18a, 18b, 18c and is realized in this example as a triple photodiode 21. The appropriate circuit symbol is placed next to the respective transducers and scanners 18a, 18b and 18c as shown particularly in FIG. 4.

It is particularly noteworthy that for each of the marking tracks 19a, 19b and 19c there is provided one separate light source 17a, 17b, 17c respectively and each of them can be separately switched on and off but the three transducers 18a, 18b and 18c each scan all three tracks. Accordingly there are light conductors running from all transmitters 17 for conducting the respective light signal towards the respective track. On the output or exit side the association changes in that for each track, the central beam is conducted as the reference signal to a common transducer 18b; the signals $S_1$ from all three beams are run to the common transducer 18a and all of the three signals $S_2$ are run to the common transducer 18c using in each instance of course a separate light conductor as can be seen from the crossover structure shown in the lower portion of FIG. 2.

In particular the conduction of light from any of the light source such as 17a runs through light conductors 22a, 22b and 22c which are suppported by body 23 and run through a gap 24 in which the particular marking track carrier is moving. 24a refers to this particular side of that carrier adjacent to which these various light conductors end. Analogously light conductors 22a', 22b' and 22c' run from the opposite side 24b of that gap which is also the opposite side of the carrier of the markings, again through the carrier body 23 to the respective transducers 18a, 18b and 18c. The same is true with regard to three light conductors linking 17b (17cc) with 19b (19c) their continuation leads also to the three transducers 18a, 18b, 18c.

In order to enhance the accuracy of the device it is preferably provided that the single or several light sources 17 or 17a, 17b, 17c, 17' as well the conductors 22a, 22b, 22c and 22'-23' as well as the transducers 18 are combined in a structural unit of modular design 25. Here the ends of the respective light conductors 22a etc. are positioned in coaxial relation and in pairs opposite to each other at the outmost possible accuracy, and that accuracy is maintained by embedding the entire arrangement in what will become the carrier body 23. Subsequently the groove or gap 24 is cut into that body to accomodate the marking track.

Infrared light is received by the triple diode 21 having light sensitive surfaces whose geometry is matched to the particular configuration of marking track 2 etc. Alternatively standardized diodes can be used and the geometry of the gap and receiving area is adjusted through appropriate diaphragms. In each case it is made sure that each of the three areas will receive the same amount of light in corresponding positions. This means that if any of these devices faces fully a marking gap such as 2a the same amount of light (amplitude) is being received; blockage through a bar 2b accomplishes production of zero amplitude analogously. The adjustment particularly is made to make the operating condition comparable to conditions in which the triple photodiode runs parallel to the slots 2a and illuminates all of them in unison. Under these conditions it is made sure that the triple diode 21 produces uniformly similar output signals. The mounting 23 is then turned to obtain the angle alpha.

The conversion of signals produced and having configuration as illustrated in FIG. 3 must be provided in order to obtain rectangular i.e. digitally significant signals $S_1'$ and $S_2'$ as shown in the lower part of FIG. 3. The circuit of FIG. 5 provides this conversion from sinusoidal to rectangular signals. Specifically the circuit of FIG. 5 digitalizes the signal $S_1$ and $S_2$ on the basis of voltage comparison and in a manner to be described next.

Generally speaking the signal $S_1$ is compared with the reference signal. REF and the signal $S_2$ is separately compared with the same reference signal REF. Accordingly the triple photodiode 21 with its individual photodiode 21a, 21b and 21c are associated with and connected to ampliffers $K_1$, $K_2$ and $K_3$ respectively whereby the signal $S_1$ controls the amplifier $K_1$; the reference signal REF controls the amplifier $K_2$ and the signal $S_2$ controls the amplifier $K_3$. The individual photodiodes 21a, 21b, 21c are connected to the negative or minus connecting terminal of the amplifiers $K_1$, $K_2$ and $K_3$ respectively. Feedback coupling resistors $R_1$, $R_2$ and $R_3$ are respectively connected to the amplifier output terminals $25_a$, $25_b$ and $25_c$. The plus terminals are biased common to positive voltage supply.

The approximately sinusoidal reference signal REF is fed to impedance converter $K_4$ for purposes of signal level buffering. The buffered signal is, in addition to the two signals $S_1$ and $S_2$, then fed into comparators $K_5$ and $K_6$ via decoupling resistors $R_6$ and $R_8$ for purposes of obtaining the digitalization. The comparators $K_5$ and $K_6$ are connected to positive feedback resistors $R_4$ and $R_5$ respectively and output resistors $R_7$ and $R_9$ are respectively connected also to these comparators. The signals $S_1'$ and $S_2'$ can now be taken from the outputs of these circuits and, as shown in FIG. 3, they are two signals or signal pulses being phase shifted by 90 degrees in relation to each other.

Structural details of the device are shown in our copending application Ser. No. 734,673, filed May 15, 1985.

The invention is not limited to the embodiments described above but all changes and modifications thereof, not constituting departures from the spirit and scope of the invention, are intended to be included.

We claim:

1. In a device for digital control of a machine or movable equipment part under utilization of a drive asociated with an optical electronic increment sensor, the improvement comprising:
    a plurality of parallel track defining means with each track being defined by alternately translucent or transparent and opaque incremental marking sections;
    means defining a corresponding plurality of groups of three separate beams each, the beam of each group traversing one of each said of the increment track means, two beams of each group being close to opposite outer borders of the respective track marking and a third one of the group of beams traverses the respective center of that track;
    said beams of any of said groups being arranged so that projections of the beams of the respective group into a plane of the respective track result in scanning dots being arranged along a line having an oblique angle in relation to the direction of extension of the respective track marking sections;
    three beam combining means, respectively (i) combining the beams of all groups having traversed one border of each marking of the plurality of tracks (ii) combining the beams of all groups having traversed another border of each said marking of the plurality of tracks; and (iii) combining all beams of the groups having traversed the respective track centers; and
    pickup means for separately detecting illumination from the three beams as modulated by said marker tracks and as combined as per (i), (ii), and (iii) and providing separate electrical signals respectively representing passage of one border of all tracks, of another border of all tracks, and of the center of all tracks.

2. The improvement as in claim 1, wherein said pickup means include three separate photoelectric transducers.

3. The improvement as in claim 1, the pickup means being a triple photodiode.

4. The improvement as in claim 1, the beam defining means being a triple light emitting diode.

5. The improvement as in claim 1, wherein said angle is chosen so that signals as derived by the pickup means from the track borders in each instance are in phase opposition, a third signal being respectively plus and minus 90 degrees phase shifted to the former two signals.

6. The improvement as in claim 2, there being three tracks and means defining three separate scanning beams for each track, arranged so that each track is traversed along its border by outer beams and by a central beam; and means for combining corresponding beams having traversed one border each, in one of the two transducers, other outer beams having traversed another border each of the tracks in a second one of the three transducers; and other beams having traversed central track portions in a third one of the three transducers.

7. The improvement as in claim 5, including circuit means for separately combining the signals having phase opposition with the third signal as reference signal.

8. The improvement as in claim 1, wherein light conductors run separate beams towards the tracks, and further light conductors run light from the tracks to the pick up means, the light conductors being oriented so that the tracks are traversed by beams at right angles.

9. The improvement as in claim 6, wherein light conductors run separate beams towards the tracks, and further light conductors run light from the tracks to the pick up means, the light conductors being oriented so that the tracks are traversed by beams at right angles.

10. The improvement as in claim 1, wherein separate light conductors run from the tracks to the transducers in crossover relation.

11. The improvement as in claim 6, wherein separate light conductors run from the tracks to the transducers in crossover relation.

* * * * *